United States Patent
Funahashi

(10) Patent No.: US 10,301,456 B2
(45) Date of Patent: May 28, 2019

(54) RUBBER COMPOSITION FOR VIBRATION DAMPING RUBBERS

(71) Applicant: TOYO TIRE & RUBBER CO., LTD., Osaka-shi, Osaka (JP)

(72) Inventor: Hiroyasu Funahashi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 15/531,540

(22) PCT Filed: Dec. 10, 2015

(86) PCT No.: PCT/JP2015/084664
§ 371 (c)(1),
(2) Date: May 30, 2017

(87) PCT Pub. No.: WO2016/121240
PCT Pub. Date: Aug. 4, 2016

(65) Prior Publication Data
US 2017/0327668 A1    Nov. 16, 2017

(30) Foreign Application Priority Data

Jan. 27, 2015  (JP) .................................. 2015-013178

(51) Int. Cl.
| | |
|---|---|
| *C08L 7/00* | (2006.01) |
| *C08K 5/3415* | (2006.01) |
| *C08L 101/00* | (2006.01) |
| *C08L 9/00* | (2006.01) |
| *C08K 3/06* | (2006.01) |
| *C08K 5/18* | (2006.01) |
| *C08K 5/3445* | (2006.01) |
| *C08L 57/02* | (2006.01) |
| *C08L 91/00* | (2006.01) |
| *C08L 91/06* | (2006.01) |

(52) U.S. Cl.
CPC .................. *C08L 7/00* (2013.01); *C08K 3/06* (2013.01); *C08K 5/18* (2013.01); *C08K 5/3415* (2013.01); *C08K 5/3445* (2013.01); *C08L 9/00* (2013.01); *C08L 57/02* (2013.01); *C08L 91/00* (2013.01); *C08L 91/06* (2013.01); *C08L 101/00* (2013.01); *C08L 2205/035* (2013.01)

(58) Field of Classification Search
CPC ....................................................... C08L 7/00
See application file for complete search history.

(56) References Cited

U.S. PATENT DOCUMENTS

| | | |
|---|---|---|
| 4,803,250 A | 2/1989 | Nagasaki et al. |
| 5,684,091 A | 11/1997 | Maly et al. |
| 2014/0361475 A1 | 12/2014 | Nagata |
| 2015/0337123 A1* | 11/2015 | Funahashi ................ C08L 9/00 525/236 |
| 2016/0115303 A1* | 4/2016 | Funahashi ................ C08L 9/00 524/526 |

FOREIGN PATENT DOCUMENTS

| | | | |
|---|---|---|---|
| CN | 104837909 A | 8/2015 | |
| JP | 61-14238 A | 1/1986 | |
| JP | 61-166844 A | 7/1986 | |
| JP | 61-168642 A | 7/1986 | |
| JP | 3-258840 A | 11/1991 | |
| JP | 9-12779 A | 1/1997 | |
| JP | 2008-94973 A | 4/2008 | |
| JP | 2014-105273 A | 6/2014 | |
| JP | 2014133804 A * | 7/2014 | ............... C08L 9/00 |
| JP | 2014-237753 A | 12/2014 | |
| JP | 2015-4005 A | 1/2015 | |

OTHER PUBLICATIONS

International Search Report dated Feb. 2, 2016, issued in counterpart of International Application No. PCT/JP2015/084664 (3 pages).
Lu, Chuo; "Researches on preparation process, optimum recipe and used amount of homogenizing-dispersing agent", Chinese master's thesis Full-text Database Engineering Science and Technology edition 1, Jul. 15, 2014, pp. 18-42 with English translation; cited in Chinese Office Action dated Feb. 5, 2018. (52 pages).
Office Action dated Feb. 5, 2018, issued in counterpart Chinese application No. 201580063758.2 with English translation. (8 pages).
Notification of Transmittal of Translation of the International Preliminary Report on Patentability (Form PCT/IB/338) issued in counterpart International Application No. PCT/JP2015/084664, dated Aug. 10, 2017 with Forms PCT/IB/373 and PCT/ISA/237. (8 pages).
Office Action dated Sep. 10, 2018, issued in counterpart Chinese Application No. 201580063758.2, with English translation. (8 pages).
Office Action dated Sep. 13, 2018, issued in counterpart Japanese Application No. 2015-013178, with English translation. (9 pages).
Office Action dated Mar. 28, 2019, issued in counterpart CN application No. 201580063758.2, with English translation. (13 pages).

\* cited by examiner

*Primary Examiner* — Arrie L Reuther
(74) *Attorney, Agent, or Firm* — Westerman, Hattori, Daniels & Adrian, LLP

(57) ABSTRACT

A rubber composition for vibration damping rubbers, comprises a rubber component, a sulfur-based vulcanizing agent, a resin, and a bismaleimide. The resin is a mixed resin comprising at least an aromatic hydrocarbon resin and an aliphatic hydrocarbon resin. When the total amount of the rubber component is regarded as 100 parts by weight, the rubber composition preferably contains 1.5 parts by weight or less of the sulfur-based vulcanizing agent.

3 Claims, No Drawings

RUBBER COMPOSITION FOR VIBRATION DAMPING RUBBERS

TECHNICAL FIELD

The present invention relates to a rubber composition for vibration damping rubbers that contains a rubber component, sulfur, a resin, and a bismaleimide.

BACKGROUND ART

While recent automobiles have been made higher in power, the automobiles have been required to exhibit silence. Moreover, the use environment of automobiles is also various, and the automobiles may be used in districts high in ambient temperature, such as Southeast Asia and Middle East countries, and may be used in cold districts. In general, as for automobiles having a vibration damping rubber which contains natural rubber as a main component and which is improved in heat resistance, problems are not especially caused when the automobiles are used in districts high in ambient temperature. However, in the case of allowing the automobiles to stand still in cold districts for a long term, abnormal vibrations may be generated when their engine is re-started. A reason therefor would be as follows: when their vibration damping rubber is exposed to a very low temperature (for example, about $-30°$ C.), the dynamic spring constant of the rubber increases so that the function of the rubber as a vibration damping rubber is remarkably deteriorated. Accordingly, in consideration of the silence of automobiles, it is desired in the actual circumstances to develop a rubber composition for vibration damping rubbers which is a rubber showing a small variation in dynamic spring constant particularly at low temperatures.

As described above, in general, as a rubber component for a rubber composition for vibration damping rubbers, a rubber composition containing natural rubber as a main component has been hitherto used. As a technique of decreasing a variation in the dynamic spring constant of a vulcanized rubber of this rubber component-containing rubber composition, known is a technique of increasing the amount of a sulfur-based vulcanizing agent in the rubber composition. However, this technique tends to deteriorate the heat resistance of the vibration damping rubbers. Thus, this technique makes it difficult to make the heat resistance compatible with the restraint of a change, with time, in the dynamic spring constant in the range of low temperatures.

Patent Document 1 listed below describes a technique of blending, in a rubber composition, a rubber component, an amine-ketone-based antiaging agent, a mixed resin, stearic acid and zinc oxide in order that the resultant composition can be used for tire treads and be improved in gripping performance, abrasion resistance and external appearance properties.

PRIOR ART DOCUMENT

Patent Document

Patent Document 1: JP-A-2014-105273

SUMMARY OF THE INVENTION

Problems to be Solved by the Invention

However, an object of the technique described in Patent Document 1 is merely to improve the rubber composition in various properties for tire treads. Thus, the document neither describes nor suggests any restraint of a change, with time, in the dynamic spring constant in the range of very low temperatures.

In light of this actual situation, the present invention has been made. An object thereof is to provide a rubber composition, for vibration damping rubbers, that can be restrained from being changed in dynamic spring constant in the range of very low temperatures.

Means for Solving the Problems

In order to solve the above-mentioned problems, the inventor has made eager investigations to find out that the object can be attained by a rubber composition for vibration damping rubbers described below. Thus, the present invention has been accomplished.

The present invention relates to a rubber composition for vibration damping rubbers containing a rubber component, a sulfur-based vulcanizing agent, a resin, and a bismaleimide, wherein the resin is a mixed resin including at least an aromatic hydrocarbon resin and an aliphatic hydrocarbon resin.

In the rubber composition for vibration damping rubbers according to the present invention, a bismaleimide is used together with a mixed resin including at least an aromatic hydrocarbon resin and an aliphatic hydrocarbon resin in the presence of a sulfur-based vulcanizing agent. This use makes it possible that a vulcanized rubber of the rubber composition can be restrained from being changed with time in dynamic spring constant in the range of very low temperatures while ensuring heat resistance. A reason that these advantageous effects are obtained is unclear. However, the reason is presumed as follows: the rubber composition contains the bismaleimide to improve the vulcanized rubber in heat resistance; and further, in particular, the aromatic ring of the aromatic hydrocarbon resin in the mixed resin hinders the rubber component from being crystallized, and hinders the growth of the crystal in the range of very low temperatures; consequently, the dynamic spring constant of the vulcanized rubber can be restrained from increasing.

In the rubber composition for vibration damping rubbers, when the total amount of the rubber component is regarded as 100 parts by weight, the rubber composition preferably contains 1.5 parts by weight or less of the sulfur-based vulcanizing agent. This case further improves the finally obtained vibration damping rubber in heat resistance.

In the rubber composition for vibration damping rubbers, when the total amount of the rubber component is regarded as 100 parts by weight, the rubber composition preferably contains 10 to 30 parts by weight of polybutadiene rubber and 20 to 60 parts by weight of polyisoprene rubber. This case can restrain, at a higher level, the change with time in the dynamic spring constant of the finally obtained vibration damping rubber in the range of very low temperatures.

Mode for Carrying Out the Invention

The rubber composition for vibration damping rubbers according to the present invention contains a rubber component, a sulfur-based vulcanizing agent, a resin, and a bismaleimide.

In the present invention, the rubber composition preferably contains a diene rubber as the rubber component. Examples of the diene rubber include natural rubber (NR), butadiene rubber (BR), isoprene rubber (IR), styrene butadiene rubber (NBR), butyl rubber (IIR), and acrylonitrile butadiene rubber (NBR). When the total amount of the rubber component is regarded as 100 parts by weight, the rubber composition preferably contains 10 to 30 parts by weight of polybutadiene rubber and 20 to 60 parts by weight of polyisoprene rubber from the viewpoint of an effective restraint of the change with time in the dynamic spring constant in the range of very low temperatures. When the rubber composition contains, as the rubber component, natural rubber in a large proportion, the advantageous effect of restraining the change with time in the dynamic spring constant in the range of very low temperatures may become insufficient. Thus, the natural rubber content is preferably 60 parts by weight or less, more preferably 40 parts by weight or less.

The rubber composition according to the present invention contains a sulfur-based vulcanizing agent together with the rubber component. The sulfur for the sulfur-based vulcanizing agent may be of any kind as far as the sulfur is of a kind for ordinary rubbers. The kind of sulfur is, for example, powdery sulfur, precipitated sulfur, insoluble sulfur, or highly dispersible sulfur. A vulcanization accelerator decomposable to release active sulfur to contribute to vulcanization reaction of rubber is also included in the category of the sulfur-based vulcanizing agent. Examples of the vulcanization accelerator include tetramethylthiuram disulfide, tetraethylthiuram disulfide, tetrabutylthiuram disulfide, tetraoctylthiuram disulfide, and 2-(4'-morpholinodithio)benzothiazole. In order to prevent a deterioration in the heat resistance of the rubber composition for vibration damping rubbers according to the present invention, the content of the sulfur-based vulcanizing agent in this composition is preferably made smaller. Specifically, the content is preferably less than 1.5 parts by weight, more preferably less than 1.0 part by weight, in particular preferably less than 0.8 part by weight for 100 parts by weight of the rubber component. If the content of the sulfur-based vulcanizing agent is too small, it is feared that the vulcanized rubber becomes insufficient in crosslinking density to be lowered in rubber strength and others. It is therefore preferred that the sulfur-based vulcanizing agent content is 0.5 part by weight or more for 100 parts by weight of the rubber component.

In the rubber composition for vibration damping rubbers according to the present invention, as a resin incorporated together with the bismaleimide in this composition, a mixed resin is used. This mixed resin includes at least an aromatic hydrocarbon resin and an aliphatic hydrocarbon resin. The mixed resin includes at least a phenolic adhesive resin, a coumarone resin, an indene resin, a coumarone indene resin or any other aromatic hydrocarbon resin, and any aliphatic hydrocarbon resin, its hydrocarbon being, for example, a C5-, C8-, or C9-hydrocarbon. The rubber composition may optionally contain any other resin known to those skilled in the art, examples of the resin including a xylene resin, a phenolic resin, a terpene resin, and a ketone resin. From the viewpoint of an effective restraint of the change with time in the dynamic spring constant in the range of very low temperatures, the mixed resin content is preferably from 1 to 5 parts by weight, more preferably from 2 to 4 parts by weight for 100 parts by weight of the rubber component.

The bismaleimide may be a bismaleimide known to those skilled in the art, and is preferably a bismaleimide compound represented by the following general formula (1):

[Formula 1]

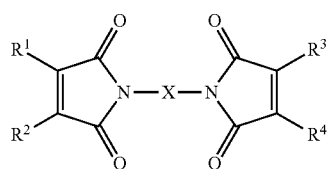

(1)

wherein $R^1$ to $R^4$ are the same as or different from each other, and each represent a hydrogen atom, or an alkyl, amino, nitro or nitroso group; and X represents a bivalent organic group. Specific examples of the bismaleimide compound represented by the general formula (1) include N,N'-M-phenylenebismaleimide, N,N'-(4,4'-diphenylmethane)bismaleimide, bis(3-ethyl-5-methyl-4-maleimidephenyl)methane, and 2,2'-bis(4-(4-maleimidephenoxy)phenyl)propane. In order that the vulcanized rubber can be effectively restrained from being changed with time in dynamic spring constant in the range of very low temperatures while being improved in heat resistance, the bismaleimide content is preferably from 0.2 to 2.5 parts by weight, more preferably from 0.5 to 2.0 parts by weight for 100 parts by weight of the rubber component.

As far as the advantageous effects of the present invention are not damaged, any compounding agent used ordinarily in the rubber industry may be appropriately blended in the rubber composition for vibration damping rubbers of the present invention, together with the above-mentioned rubber component, sulfur-based vulcanizing agent, resin, bismaleimide and wax. Examples of the compounding agent include a wax, a vulcanization accelerator, carbon black, silica, a silane coupling agent, zinc oxide, stearic acid, a vulcanization accelerator aid, a vulcanization retardant, an antiaging agent, a softening agent, such as an oil, and a processing aid.

The wax may be a wax known to those skilled in the art, for example, microcrystalline wax, which is a wax separated and purified from a reduced-pressure distillation bottom or heavy distillate, or paraffin wax, which is separated and purified from reduced-pressure distillation distillate. In order to restrain, at a higher level, the change with time in the dynamic spring constant in the range of very low temperatures, it is preferred that the wax content is large for 100 parts by weight of the rubber component. However, if the content is too large, the wax may bloom onto a rubber product after the rubber composition is vulcanized and molded. Thus, the product may be poor in external appearance. Thus, the wax content is preferably from 0.5 to 5.0 parts by weight, more preferably from 1.0 to 4.0 parts by weight for 100 parts by weight of the rubber component.

The kind of carbon black may be, for example, SAF, ISAF, HAF, FEF or GPF. Carbon black is usable as far as carbon black can adjust rubber properties of the vulcanized rubber, such as the hardness, reinforcing performance, and low exothermic property of the rubber. The blend amount of carbon black is preferably from 10 to 80 parts by weight, more preferably from 15 to 75 parts by weight for 100 parts by weight of the rubber component. If this amount is less than 10 parts by weight, the rubber composition cannot gain the reinforcing effect of carbon black sufficiently. If the amount is more than 80 parts by weight, the rubber composition may be deteriorated in, for example, exothermic property and rubber miscibility, and processability when processed.

The vulcanization accelerator may be a vulcanization accelerator used usually for rubber vulcanization. Examples thereof include sulfenamide-based, thiuram-based, thiazole-based, thiourea-based, guanidine-based, and dithiocarbamic acid salt-based vulcanization accelerators. These may be used singly or in an appropriate mixture form.

The antiaging agent may be an antiaging agent used usually for rubbers. Examples thereof include aromatic amine-based, amine-ketone-based, monophenolic, bisphenolic, polyphenolic, dithiocarbamic acid salt-based, and thiourea-based antiaging agents. These may be used singly or in an appropriate mixture form.

The rubber composition for vibration damping rubbers of the present invention can be obtained by kneading a rubber component, a sulfur-based vulcanizing agent, a resin, and a bismaleimide, and optional components such as carbon black, silica, a silane coupling agent, zinc oxide, stearic acid, a vulcanization accelerator, an antiaging agent, and an oil, using an ordinary kneading machine used in the rubber industry, such as a Banbury mixer, a kneader, or a roller.

The method for blending the individual components together is not particularly limited, and may be, for example, any one of the following: a method of kneading, in advance, ingredients other than the sulfur-based vulcanizing agent, the vulcanization accelerator, and other vulcanization-related components to prepare a masterbatch, adding the remaining components thereto, and further kneading these components; a method of adding the individual components in any order to a machine as described above, and then kneading the components; and a method of adding all the components simultaneously to the machine, and then kneading the components.

The individual components are heated, and then molded. The molded body is then vulcanized. In this way, a vibration damping rubber can be produced which can be restrained from being changed with time in dynamic spring constant in the range of very low temperatures. This vibration damping rubber is usable suitably for the following: vibration damping rubbers for automobiles, for example, for their engine mounts, torsional dampers, body mounts, cap mounts, member mounts, strut mounts and muffler mounts; vibration damping rubbers for railway vehicles; vibration damping rubbers for industrial machines; seismic isolation rubbers for buildings; and vibration damping rubbers or seismic isolation rubbers for seismic isolation rubber supports and others. The vibration damping rubber is particularly useful as engine mounts, and other constituent members of vibration damping rubbers for automobiles, which are required to have heat resistance.

EXAMPLES

Hereinafter, working examples of the present invention will be specifically described.
(Preparation of Rubber Composition)
In accordance with a formulation in Table 1, a rubber composition of each of Examples 1 to 3 and Comparative Example 1 was blended in 100 parts by weight of a rubber component. An ordinary Banbury mixer was used to knead this blend to prepare a rubber composition. The individual compounding agents shown in Table 1 are shown below.
a) Rubber component
Polyisoprene rubber: synthetic polyisoprene rubber ("IR 2200" manufactured by JSR Corporation (Mooney viscosity ($ML_{1+4}$) (100° C.))=82; cis 1,4-bond content: 98.5%; tans 1,4-bond content: 1.5%; 3,4-vinyl bond content: 0%; number-average molecular weight Mn=300000)
Polybutadiene rubber (BR) ("CB22" manufactured by Lanxess GmbH; (Mooney viscosity ($ML_{1+4}$) (100° C.))=63; cis 1,4-bond content: 96%; number-average molecular weight Mn=250000)
Natural rubber (NR): trade name "RSS #3"
b) Sulfur-based vulcanizing agents
(A): 5% Oil-treated sulfur
(B): Sulfur-based vulcanization accelerator (thiuram-based vulcanization accelerator: tetramethylthiuram disulfide) ("NOCCELER TT-P (TT)", manufactured by Ouchi Shinko Chemical Industrial Co., Ltd.)
c) Vulcanization accelerator: thiazole-based vulcanization accelerator, di-2-benzothiazolyl disulfide ("NOCCELER DM-P (DM)", manufactured by Ouchi Shinko Chemical Industrial Co., Ltd.)
d) Carbon black: GPF ("SEAST V", manufactured by Tokai Carbon Co., Ltd.)
e) Zinc flower: No. 3 zinc flower
f) Stearic acid: industrial stearic acid
g) Antiaging agents
(A): aromatic amine-based antiaging agent: N-phenyl-N'-(1,3-dimethylbutyl)-p-phenylenediamine ("NOCRAC 6C", manufactured by Ouchi Shinko Chemical Industrial Co., Ltd.)
(B): amine-ketone-based antiaging agent: 2,2,4-trimethyl-1,2-dihydroquinoline polymer ("NOCRAC 224", manufactured by Ouchi Shinko Chemical Industrial Co., Ltd.)
(C): imidazole-based antiaging agent: 2-mercaptobenzoimidazole zinc salt ("NOCRAC MBZ", manufactured by Ouchi Shinko Chemical Industrial Co., Ltd.)
h) Bismaleimide: N,N'-(4,4-diphenylmethane)bismaleimide ("BMI-HS", manufactured by K.I Chemical Industry Co., Ltd.)
i) Oil: "JOMO PROCESS NC-140" (manufactured by Japan Energy Corporation)
j) Wax: "OZOACE 0355" (manufactured by NIPPON SEIRO CO., LTD.)
k) Mixed resins including at least an aromatic hydrocarbon resin and an aliphatic hydrocarbon resin
(A): "STRUKTOL HP-55", manufactured by Struktol AG
(B): "STRUKTOL 40 MS FLAKE", manufactured by Struktol AG (Evaluation)

A predetermined mold was used to heat and vulcanize each of the rubber compositions at 17° C. for 20 minutes to yield a sample rubber. The rubber was evaluated.

<Dynamic Spring Constant>

In accordance with JIS K 6385, the dynamic spring constant and the static spring constant of the sample were measured. Furthermore, from the ratio between the former and the latter, the dynamic magnification of the sample was calculated.

<Change with Time in Dynamic Spring Constant in Very Low Temperature Range (Low-Temperature Property)>

Using a sample 50 mm in diameter and 25 mm in height, obtained from the sample rubber, the dynamic spring constant thereof was measured under conditions for not breaking its crystal, i.e., an initial compression of 0.25 mm, an amplitude of 0.5 mm and a frequency of 100 Hz. The measurement, was made at ambient temperature at an initial time, and at −30° C. after 240 hours. The change was determined from the change ratio between the value obtained in the former and that obtained in the latter. It is demonstrated that as the change ratio is lower, the sample is smaller in change with time in the dynamic spring constant in the very low temperature range and is better. The results are shown in Table 1.

<Processing Stability>

The t5 scorch time of the sample was measured. The evaluation thereof was made, using an index obtained when the time of Comparative Example 1 was regarded as 100. As the numerical number is larger, the sample is longer in t5 scorch time to be better in processing stability. The results are shown in Table 1.

TABLE 1

|  | Example 1 | Example 2 | Example 3 | Comparative Example 1 |
|---|---|---|---|---|
| Butadiene rubber (CB22) | 20 | 20 | 20 | 20 |
| Natural rubber | 40 | 40 | 40 | 40 |
| Synthetic isoprene rubber (IR 2200) | 40 | 40 | 40 | 40 |
| Carbon black (GPF) | 35 | 35 | 35 | 35 |
| Oil (aroma type NC-140) | 10 | 10 | 10 | 10 |
| Zinc flower No. 3 | 5 | 5 | 5 | 5 |
| Stearic acid | 1 | 1 | 1 | 1 |
| Wax (OZOACE 0355) | 2 | 2 | 2 | 2 |
| STRUKTOL HP-55 (2) | 2 |  |  |  |
| STRUKTOL 40 MS FLAKE (1) |  | 2 | 4 |  |
| Antiaging agent A (aromatic amine-based) | 2 | 2 | 2 | 2 |
| Antiaging agent B (amine-ketone-based) | 2 | 2 | 2 | 2 |
| Antiaging agent C (imidazole-based) | 2 | 2 | 2 | 2 |
| Sulfur | 0.2 | 0.2 | 0.2 | 0.2 |
| Sulfur-based vulcanization accelerator A (thiuram-based) | 0.6 | 0.6 | 0.6 | 0.6 |
| Vulcanization accelerator B (thiazole-based) | 2 | 2 | 2 | 2 |
| Crosslinking aid A (bismaleimide) | 1.5 | 1.5 | 1.5 | 1.5 |
| Magnification of dynamic spring constant change after still-standing at −30° C. for 240 hours | 9.8 times | 9.7 times | 8.9 times | 19 times |
| Processing stability (t5 scorch) | 13.5 min. | 13.8 min. | 14.4 min. | 10.0 min. |
| INDEX | 135 | 138 | 144 | 100 |

From the results in Table 1, it is understood that in the vulcanized rubber of the rubber composition according to each of Examples 1 to 3, the change with time in the dynamic spring constant is sufficiently further restrained in the range of the very low temperatures than in the vulcanized rubber of the rubber composition according to Comparative Example 1. It is understood that the rubber compositions according to Examples 1 to 3 show a long t5 scorch time to be excellent in processing stability.

The invention claimed is:

1. A rubber composition for vibration damping rubbers, comprising a rubber component, a sulfur-based vulcanizing agent, a resin, and a bismaleimide,
    wherein the resin is a mixed resin comprising at least an aromatic hydrocarbon resin and an aliphatic hydrocarbon resin,
    wherein an amount of the resin is from 2 to 4 parts by weight for 100 parts by weight of the rubber component.

2. The rubber composition for vibration damping rubbers according to claim 1, wherein when the total amount of the rubber component is regarded as 100 parts by weight, the rubber composition contains 1.5 parts by weight or less of the sulfur-based vulcanizing agent.

3. The rubber composition for vibration damping rubbers according to claim 1, wherein when the total amount of the rubber component is regarded as 100 parts by weight, the rubber composition contains 10 to 30 parts by weight of polybutadiene rubber and 20 to 60 parts by weight of polyisoprene rubber.

* * * * *